No. 825,332. PATENTED JULY 10, 1906.
J. D. MACK.
BROOM HOLDER.
APPLICATION FILED DEC. 26, 1905.
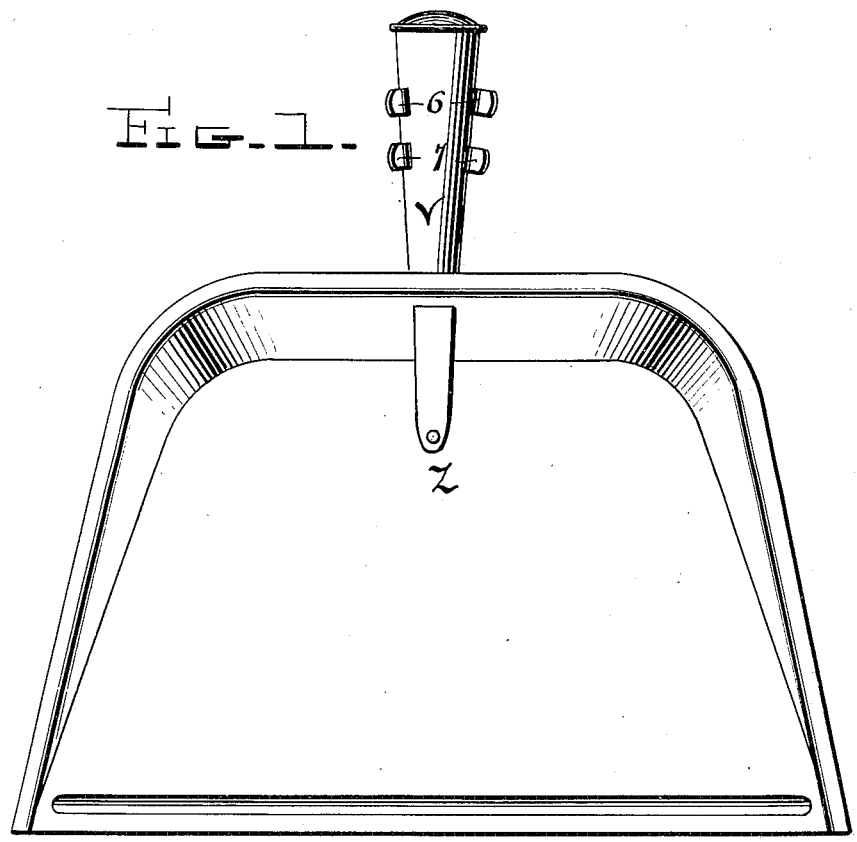
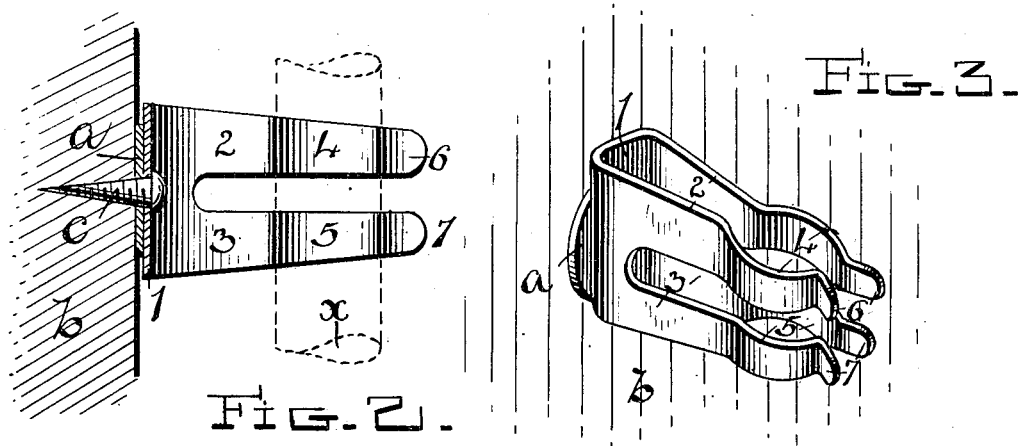
WITNESSES:
Jas. A. Koehl.
C. B. Berger.
INVENTOR
Josiah D. Mack
BY Geo. W. Sues.
Attorney

UNITED STATES PATENT OFFICE.

JOSIAH D. MACK, OF SALEM, NEW YORK.

BROOM-HOLDER.

No. 825,332.	Specification of Letters Patent.	Patented July 10, 1906.

Application filed December 26, 1905. Serial No. 293,337.

*To all whom it may concern:*

Be it known that I, JOSIAH D. MACK, a citizen of the United States, and a resident of Salem, in the county of Washington and State of New York, have invented a certain new and useful Improvement in Broom-Holders, of which the following is a specification.

The object of my invention is to provide a broom-holder adapted also to be used in holding other handle-provided articles, such as dust-pans, whisk-brooms, and the like.

In the accompanying drawings I have shown in Figure 1 a view of my holder supporting a dust-pan. Fig. 2 is a sectional view of my broom-holder, disclosing a portion of a broom-handle in dotted lines, while Fig. 3 shows a perspective view of my broom-holder.

The object of my invention is to provide a simple device adapted to be secured to a wall or other suitable place to receive a handle-provided article, such as a dust-pan, broom, whisk-broom, and the like.

As the handles are apt to be of irregular shape, I provide a holder made of spring sheet metal having two separate and distinct sets of holding-arms, each arm being permitted an independent movement.

My broom-holder comprises a member made of the best sheet spring-steel, oil-tempered, and comprises a flat base portion 1, from which extends two sets of arms, (marked 2 and 3,) each arm being provided with a bowed portion, as is shown at 4 and 5, forming holding or clasping collars, each terminating in an outwardly-flared lip, as is shown at 6 and 7 in Fig. 3.

The flat base portion of the holder is perforated and adapted to form a bearing for the head of a suitable screw *c*, the broom-holder being preferably secured to a vertical surface, as a wall *b*, as shown in Figs. 2 and 3. In order to insure the holder being held freely, I interpose the washer *a* between the holder and the wall, as shown in Figs. 2 and 3.

In order to insert a broom-handle, the operator forces the same between the outwardly-flared lips 6 and 7, which results in spreading the four arms outwardly until the handle finds a seating within the bowed portions 4 and 5, within which it is securely clasped. By this arrangement any swinging movement of the broom instead of straining the arms will be lost at the pivot-point formed by means of the screw *c*. This is an important point, as by means of my pivotally-held holder an article held will plumb itself without straining the holder. So, also, in having four separate and distinct arms an irregularly-shaped article may be clasped. In Fig. 1, for instance, I have shown a dust-pan *z* the cone-shaped handle *v* of which is firmly clasped, the upper arms, however, being distended somewhat further than the lower arms as disclosed.

The length of the tapering arms permits ample space for the hand between the wall and broom-handle when adjusting the broom.

It will be noticed that there is a space between the two sets of arms 2 and 3, so that an article may be grasped between the arms to remove the same.

In Fig. 2 I show in dotted lines the position of a broom-handle *x*.

It is of course understood that these holders may be made of various sizes.

Having thus described my said invention, what I claim as new, and desire to secure by United States Letters Patent, is—

In a device of the character described, a sheet spring-steel flat-based perforated member provided with four converging arms disposed in sets of twos, each arm being provided with an intermediate bowed portion and terminating in an outwardly-flaring lip, a headed pin extending through said perforation, said head working upon said flat-based channel, and a bearing-plate to pivotally receive said flat-based channel portion, all arranged in the manner set forth.

JOSIAH D. MACK.

Witnesses:
 FREDERICK FRASER,
 JOHN O. WILSON.